United States Patent [19]

Crinkelmeyer

[11] 4,024,918
[45] May 24, 1977

[54] METHOD OF CEMENTING A WELL

[75] Inventor: Oliver W. Crinkelmeyer, Tulsa, Okla.

[73] Assignee: The Dow Chemical Company, Midland, Mich.

[22] Filed: June 23, 1975

[21] Appl. No.: 589,324

Related U.S. Application Data

[62] Division of Ser. No. 558,569, March 14, 1975, Pat. No. 3,998,773.

[52] U.S. Cl. .................................. 166/293
[51] Int. Cl.² ................. E21B 33/138; E21B 33/14
[58] Field of Search ............ 166/293, 294, 281, 308

[56] References Cited

UNITED STATES PATENTS

| | | | |
|---|---|---|---|
| 3,132,693 | 5/1964 | Weisand | 166/293 |
| 3,254,719 | 6/1966 | Root | 166/308 |
| 3,409,080 | 11/1968 | Harrison | 166/293 |
| 3,465,825 | 9/1969 | Hook et al. | 166/293 |
| 3,558,335 | 1/1971 | Messenger | 166/292 X |
| 3,582,375 | 6/1971 | Tragesser, Jr. | 166/293 X |
| 3,804,174 | 4/1974 | Chatterji et al. | 166/293 |
| 3,821,985 | 7/1974 | George | 166/293 |

Primary Examiner—Stephen J. Novosad
Attorney, Agent, or Firm—Bruce M. Kanuch; Glenn H. Korfhage

[57] ABSTRACT

A hydraulic cement slurry is disclosed comprising as parts by weight, a hydraulic cement; from 35 to about 65 parts of water per 100 parts of hydraulic cement and a sufficient quantity of both; polyethylene oxide and an alkali metal salt of the condensation product of mononaphthalene sulfonic acid and formaldehyde to reduce the loss of fluid from the cement slurry. A method of cementing locations in a subterranean geologic formation penetrated by a borehole is also disclosed.

5 Claims, No Drawings

METHOD OF CEMENTING A WELL

CROSS-REFERENCE TO RELATED APPLICATION

This is a division, of application Ser. No. 558,569 filed Mar. 14, 1975 now U.S. Pat. No. 3,998,773, issued Dec. 21, 1976.

BACKGROUND OF THE INVENTION

The invention is an improved aqueous hydraulic cement slurry which is suited for use in cementing a well, particularly a well bore which penetrates a subterranean formation which produces a petroleum fluid, e.g., oil and/or gas, and/or water. The term "hydraulic cement" as used herein refers to those inorganic materials which set to a hard monolithic mass under water and include, for example, Portland, aluminous and pozzolana cements and various refinaments thereof.

Hydraulic cements have been employed to improve the process of drilling wells and producing petroleum fluids therefrom. In these methods a hydraulic cement slurry is employed to cement a casing in place and also for cementing off permeable zones of permeable formations into which valuable materials may be lost. Also the cement is employed to inhibit the intrusion of aqueous fluids into the petroleum fluid producing zone of an oil or gas well. One of the desirable characteristics of an aqueous hydraulic cement slurry is that the fluid content thereof must not be readily lost to more porous medium, e.g., the geologic formation, for this causes the hydraulic cement slurry to prematurely set and thus be unsuitable in the cementing process. Various additaments, generally called fluid loss agents, have been added to hydraulic cement slurries to reduce the amount of fluid which is lost from the slurry to a permeable media. Although many different fluid loss additives have been discovered and employed many of them have other undesirable characteristics such as, for example, retarding the rate of set of the cement beyond an acceptable period of time. The present invention concerns the discovery of a fluid loss additive which provides excellent fluid loss properties while also not retarding the rate of set of the hydraulic cement slurry.

SUMMARY OF THE INVENTION

The cement composition of the present invention comprises, a hydraulic cement; and based on 100 parts by weight of said hydraulic cement from about 35 to about 65 parts of water; from about 0.25 to about 2.5 parts by weight of an alkali metal salt of the condensation product of monophthalene sulfonic acid and formaldehyde and from about 0.6, preferably about 0.75, to about 2 parts by weight of polyethylene oxide.

Other functional additives well known in the art such as weighing agents, aggregates, e.g., sand, strength improvers, fibers, corrosion inhibitors, freezing point depressants and the like may also be employed in the hydraulic cement slurry in an amount which is functionally sufficient to provide the desired characteristics.

The fluid loss characteristics of the so prepared cement will vary considerably depending on such parameters as: the type of cement; the weight of the cement slurry; the differential pressure to which the cement slurry is subjected; the molecular weight and quantity of polyethylene oxide employed; the amount of condensation product employed, other fluid loss agents present and the like. In any event it is preferred to adjust all these parameters in such a manner that the fluid loss from a cement slurry subjected to the test outlined hereinafter is less than about 300 milliliters with a test time of 30 minutes and temperature of 144° F (62.22° C). Generally cements employed for linear cementing operations can tolerate a fluid loss of from 200–300 milliliters in 30 minutes, while when squeeze cementing a fluid loss of less than about 100 milliliters within 30 minutes is preferred.

The cement composition defined above is employed in standard cementing practice well known in the art.

DETAILED DESCRIPTION OF THE INVENTION

The alkali metal salt of the condensation product of mononaphthalene sulfonic acid and formaldehyde is preferably lithium, sodium or a mixed salt lithium-sodium of the solfonic acid. The salt of the condensation product is known to be a turbulence inducer, see U.S. Pat. No. 3,465,825, and although it was suggested in the same patent that it lessens the fluid loss of fluid from the hydraulic cement slurry it has been discovered that its fluid loss advantage are minimal. A description of this condensation product can be found at column 3, line 31 through column 4, line 57 of U.S. Pat. No. 3,465,825. These teachings are specifically incorporated herein by reference.

The polyethylene oxide employed in the practice of the present invention is a resin preferably having a molecular weight of at least about 75,000. Molecular weights of at least about 300,000 are preferred. Methods of preparing the polyethylene oxides are well known in the art and reference may be had to the *Encyclopedia of Polymer Science and Technology*, Vol. 6, pages 103–143 by F. W. Stone and J. J. Stratta, 1967, for a summary of polyethylene polymers, their uses, characteristics and methods of preparation.

Any hydraulic cement such as those falling within the American Petroleum Institute (API) classes designated A, B, C, D, E, F, G, H, J and N may be employed in the practice of the invention.

It appears that the temperature of the cement slurry affects the fluid loss characteristics of the composition of the present invention and that at temperatures above about 150° F (65.56° C) the fluid loss properties of the slurry deteriorate. This is thought to be caused by the deterioration of polyethylene oxide polymers at this temperature.

Any convenient order of admixing the ingredients required to prepare the hydraulic cement slurry may be followed employing conventional mixing equipment. All dry materials may be first mixed together and then admixed with water or each dry material may be separately admixed with the water. Also, the polyethylene oxide and condensation product may be conveniently premixed and added to the cement slurry as a single additive. The premixture comprises from about 20 to about 30 percent by weight of the condensation product and from about 70 to about 80 percent of the polyethylene oxide material.

To carry out the method of the invention the abovedefined aqueous hydraulic cement slurry is injected down a well bore at a sufficient rate to position it at a predetermined level, usually the exterior of the casing, where the thus positioned cement composition makes good contact with the face of the formation and when desired also with the exterior of the casing where it sets to a unitary mass firmly bonded to the contacting surfaces.

The following tests illustrate the surprising results obtained by employing both the above described condensation product and polyethylene oxide in a hydraulic cement slurry. Neither of these constituents alone altered the normal fluid loss characteristics of the cement slurry to any appreciable amount. However, the combination resulted in a drastic improvement in the fluid loss properties of the hydraulic cement slurry. The test employed to measure the fluid loss was run according to the American Petroleum Institute recommended procedures for testing oil well cements found in the publication API RP 10B, 1973. The tests followed that procedure except that there were run at 1000 psi differential pressure. A test was run for a period of 30 minutes and the amount of fluid loss from the slurry in that amount of time was determined. The cement slurry contained Oklahoma H Portland cement and 46% by weight of water based on the weight of the cement. The constituents are set forth in the following Tables I and II as percent by weight of cement. The test was run at 144° F. (62.22° C). Table I lists the results of these tests. Test No. 3 is an example of a composition coming within the scope of the present invention.

TABLE I

| No. | Polyethylene Oxide | Condensation Product* | Fluid Loss Milliliters/ 30 Min. |
|---|---|---|---|
| 1 | — | — | 500** |
| 2 | 1 | — | 500 |
| 3 | 1 | 0.5 | 43 |
| 4 | — | 0.5 | 500 |

*Condensation product comprised the sodium salt of the reaction product of mononaphthalene sulfonic acid and formaldehyde.
**There was a fluid loss of over 800 milliliters, but the test was limited to measurement of 500 milliliters.

The polyethylene oxide employed in the above test had a molecular weight of about 900,000.

In another series of tests polyethylene oxide polymers having various molecular weights were tested in the hydraulic cement slurry identified immediately above. The results of this series of tests are set forth in the following Table II. Test Nos. 1, 2, 4, 6, 7, 9 and 10 are examples of compositions of the present invention.

TABLE II

| Test No. | Molecular Wt. of Polyethylene oxide | Amount of Polyethylene Oxide | Condensation Product | ml/30 min |
|---|---|---|---|---|
| 1 | 300,000 | 1% | 0.5% | 274 |
| 2 | 900,000 | 1% | 0.5% | 43 |
| 3 | 900,000 | 1% | — | 500 |
| 4 | 900,000 | 1% | 0.5% | 65 |
| 5 | 900,000 | 0.75% | 0.25% | 470 |
| 6 | 400,000 | 1% | 0.5% | 153 |
| 7 | 400,000 / 900,000 mixture | 0.5% / 0.5% | 0.5% | 48 |
| 8 | 200,000 | 1% | 0.5% | 500 |
| 9 | 900,000 | 0.75% | 0.625% | 42 |
| 10 | 900,000 | 0.75% | 0.5% | 37 |

What is claimed is:

1. A method of cementing in a borehole penetrating a subterranean foundation which comprises:
    emplacing in an area within said borehole to be cemented a hydraulic cement slurry which comprises, a hydraulic cement and based on 100 parts by weight of said cement; water, from about 35 to about 65 parts; from about 0.6 to about 2 parts of polyethylene oxide having a molecular weight of at least about 300,000 and from about 0.5 to about 2.5 parts of an alkali metal salt of the condensation product of mononaphthalene sulfonic acid and formaldehyde.

2. The method of claim 1 wherein the alkali metal is sodium or lithium.

3. The method of claim 2 wherein the temperature of the cement slurry is maintained at less than about 150° F.

4. The method of claim 1 wherein the alkali metal is lithium or sodium.

5. The method of claim 1 wherein the temperature of the cement slurry is maintained at less than about 150° F.

* * * * *